United States Patent
Hawks

(10) Patent No.: US 11,851,347 B2
(45) Date of Patent: Dec. 26, 2023

(54) SYSTEM AND METHOD FOR TREATING CONTAMINATED WATER

(71) Applicant: Wasserwerk, Inc., Columbia, MO (US)

(72) Inventor: Wayne R. Hawks, Columbia, MO (US)

(73) Assignee: WASSERWERK, INC., Columbia, MO (US)

( * ) Notice: Subject to any disclaimer, the term of this patent is extended or adjusted under 35 U.S.C. 154(b) by 765 days.

(21) Appl. No.: 16/676,248

(22) Filed: Nov. 6, 2019

(65) Prior Publication Data

US 2020/0071194 A1    Mar. 5, 2020

Related U.S. Application Data

(60) Continuation-in-part of application No. 15/877,039, filed on Jan. 22, 2018, now Pat. No. 10,577,258, (Continued)

(51) Int. Cl.
*C02F 1/28* (2023.01)
*B01D 3/14* (2006.01)
(Continued)

(52) U.S. Cl.
CPC ............... *C02F 1/281* (2013.01); *B01D 3/14* (2013.01); *B01D 15/10* (2013.01); *C02F 9/00* (2013.01);
(Continued)

(58) Field of Classification Search
CPC .... C02F 1/281; C02F 9/00; C02F 1/04; C02F 1/28; C02F 1/283; C02F 1/302;
(Continued)

(56) References Cited

U.S. PATENT DOCUMENTS

| 1,962,153 A | 6/1934 | Peterkin, Jr. |
| 2,155,318 A | 4/1939 | Liebknecht |

(Continued)

FOREIGN PATENT DOCUMENTS

| CN | 200966961 Y | 10/2007 |
| CN | 103830963 A * | 6/2014 |

(Continued)

OTHER PUBLICATIONS

Machine generated English language translation of CN-205892963-U (Year: 2017).*

(Continued)

*Primary Examiner* — Magali P Slawski
*Assistant Examiner* — Bernadette Karen McGann
(74) *Attorney, Agent, or Firm* — Husch Blackwell LLP

(57) ABSTRACT

A water treatment system including a filter compartment having a filter material adapted for removing at least one of neutrons and alpha particles from water. The filter material may comprise at least one of paraffin, cadmium, and bismuth. The filter compartment can also have a second filter material adapted for removing at least one of chloride ions and transmuted chlorine ions from the water. The second filter material may comprise at least one of coconut carbon, silicon dioxide, and ionized sand. The system can further include a container downstream of the filter compartment, the container having paraffin therein. Additionally, the system can include an absorptive manifold designed for absorbing hydrogen ions and reducing the pH of the water. A method for treating contaminated water using the water treatment system is also provided.

7 Claims, 8 Drawing Sheets

Related U.S. Application Data which is a division of application No. 14/494,277, filed on Sep. 23, 2014, now abandoned, which is a continuation-in-part of application No. 14/208,005, filed on Mar. 13, 2014, now abandoned.

(60) Provisional application No. 62/756,481, filed on Nov. 6, 2018, provisional application No. 61/881,061, filed on Sep. 23, 2013, provisional application No. 61/779,668, filed on Mar. 13, 2013.

(51) Int. Cl.
  *B01D 15/10* (2006.01)
  *C02F 9/00* (2023.01)
  *C02F 1/30* (2023.01)
  *C02F 101/12* (2006.01)
  *C02F 101/00* (2006.01)
  *C02F 1/74* (2023.01)
  *C02F 1/66* (2023.01)
  *C02F 1/48* (2023.01)
  *C02F 1/40* (2023.01)
  *C02F 1/52* (2023.01)
  *C02F 1/04* (2023.01)

(52) U.S. Cl.
  CPC .............. *C02F 1/04* (2013.01); *C02F 1/28* (2013.01); *C02F 1/283* (2013.01); *C02F 1/302* (2013.01); *C02F 1/40* (2013.01); *C02F 1/484* (2013.01); *C02F 1/5263* (2013.01); *C02F 1/66* (2013.01); *C02F 1/74* (2013.01); *C02F 2101/006* (2013.01); *C02F 2101/12* (2013.01); *C02F 2201/008* (2013.01); *C02F 2209/03* (2013.01)

(58) Field of Classification Search
  CPC .......... C02F 1/40; C02F 1/484; C02F 1/5263; C02F 1/66; C02F 1/74; C02F 2101/006; C02F 2101/12; C02F 2201/008; C02F 2209/36; C02F 1/285; C02F 1/286; C02F 1/481; C02F 1/5272; C02F 1/682; C02F 2103/007; C02F 2103/06; B01D 3/14; B01D 15/10; B01D 3/145
  See application file for complete search history.

(56) References Cited

U.S. PATENT DOCUMENTS

| | | | |
|---|---|---|---|
| 2,908,621 A * | 10/1959 | Segre | G21C 1/00 376/403 |
| 3,347,968 A | 10/1967 | Thomas et al. | |
| 3,523,076 A | 8/1970 | Goerz, Jr. et al. | |
| 4,139,420 A | 2/1979 | Stünkel | |
| 4,561,965 A | 12/1985 | Minkkinen | |
| 4,652,381 A | 3/1987 | Inglis | |
| 4,664,795 A | 5/1987 | Stegall et al. | |
| 4,783,242 A | 11/1988 | Robbins | |
| 4,997,568 A | 3/1991 | Vandervelde et al. | |
| 5,133,619 A | 7/1992 | Murfae et al. | |
| 5,230,211 A * | 7/1993 | McMahon | F02C 3/28 48/DIG. 7 |
| 5,281,332 A | 1/1994 | Vandervelde et al. | |
| 5,304,309 A | 4/1994 | Segupta | |
| 5,417,861 A | 5/1995 | Burnham | |
| 5,479,463 A | 12/1995 | Roberts | |
| 5,492,633 A | 2/1996 | Moniwa et al. | |
| 5,514,277 A | 5/1996 | Khudenko | |
| 5,632,896 A | 5/1997 | Vandervelde et al. | |
| 5,683,356 A | 11/1997 | Halperin et al. | |
| 5,814,227 A | 9/1998 | Pavlis | |
| 6,126,817 A | 10/2000 | Duran et al. | |
| 6,136,199 A | 10/2000 | Sengupta et al. | |
| 6,190,548 B1 | 2/2001 | Frick | |
| 6,221,245 B1 | 4/2001 | Colburn | |
| 6,268,596 B1 | 7/2001 | Lauf et al. | |
| 6,365,051 B1 | 4/2002 | Bader | |
| 6,663,766 B1 | 12/2003 | Adin et al. | |
| 7,081,203 B2 | 7/2006 | Helm | |
| 7,119,312 B2 | 10/2006 | Sedlmayr | |
| 7,288,188 B2 | 10/2007 | Al-Assfour | |
| 7,389,639 B2 | 6/2008 | Michalakos et al. | |
| 7,455,780 B1 | 11/2008 | Joyner et al. | |
| 7,479,215 B2 | 1/2009 | Carson et al. | |
| 7,527,736 B2 | 5/2009 | Shafer et al. | |
| 7,722,720 B2 | 5/2010 | Shafer et al. | |
| 7,758,747 B2 | 7/2010 | Bryant | |
| 7,824,552 B2 | 11/2010 | Slabaugh et al. | |
| 7,857,966 B2 | 12/2010 | Duran et al. | |
| 7,923,417 B2 | 4/2011 | Sanders et al. | |
| 7,928,040 B2 | 4/2011 | Sanders et al. | |
| 7,963,338 B1 | 6/2011 | Bader | |
| 8,012,358 B2 | 9/2011 | Slabaugh et al. | |
| 8,273,320 B2 | 9/2012 | DiTommaso et al. | |
| 8,366,936 B1 | 2/2013 | Jones | |
| 9,023,214 B2 | 5/2015 | Zolezzi-Garreton | |
| 9,475,713 B2 | 10/2016 | Zolezzi-Garreton | |
| 2001/0047956 A1 | 12/2001 | Albiston et al. | |
| 2002/0179531 A1 | 12/2002 | Sengupta et al. | |
| 2003/0066804 A1 | 4/2003 | Tipton et al. | |
| 2005/0034651 A1 | 2/2005 | Albiston et al. | |
| 2005/0098504 A1 | 5/2005 | Manz et al. | |
| 2005/0156136 A1 | 7/2005 | Sengupta et al. | |
| 2005/0288181 A1 | 12/2005 | Tranter et al. | |
| 2006/0163178 A1 | 7/2006 | Crawford et al. | |
| 2007/0039895 A1 | 2/2007 | Sengupta et al. | |
| 2007/0095823 A1 | 5/2007 | Sedlmayr | |
| 2007/0272609 A1 | 11/2007 | Suri et al. | |
| 2007/0284313 A1 | 12/2007 | Lee et al. | |
| 2008/0264859 A1 | 10/2008 | Willuweit | |
| 2009/0032446 A1 | 2/2009 | Wiemers et al. | |
| 2009/0057202 A1 | 3/2009 | Kulkarni et al. | |
| 2009/0065401 A1 | 3/2009 | Petri et al. | |
| 2009/0230059 A1 | 9/2009 | McGuire et al. | |
| 2010/0190666 A1 | 7/2010 | Ali et al. | |
| 2010/0218645 A1 | 9/2010 | Gedanken et al. | |
| 2010/0224495 A1 | 9/2010 | McGuire et al. | |
| 2010/0264014 A1 | 10/2010 | Mignon | |
| 2010/0282675 A1 | 11/2010 | Sengupta et al. | |
| 2011/0005999 A1 | 1/2011 | Randal | |
| 2011/0017677 A1 | 1/2011 | Evans | |
| 2011/0079503 A1 | 4/2011 | Heins et al. | |
| 2011/0127223 A1 | 6/2011 | Astley et al. | |
| 2011/0137465 A1 | 6/2011 | Angelilli et al. | |
| 2011/0152132 A1 | 6/2011 | Sanders et al. | |
| 2011/0152133 A1 | 6/2011 | Sanders et al. | |
| 2011/0240567 A1 | 10/2011 | Zolezzi-Garreton | |
| 2011/0272155 A1 | 11/2011 | Warren | |
| 2011/0290721 A1 | 12/2011 | Aho | |
| 2012/0006762 A1 | 1/2012 | McCabe | |
| 2012/0085530 A1 | 4/2012 | Kerfoot | |
| 2012/0097614 A1 | 4/2012 | Silva et al. | |
| 2012/0152830 A1 | 6/2012 | Shafer et al. | |
| 2012/0168157 A1 | 7/2012 | DiTommaso et al. | |
| 2012/0225800 A1 | 9/2012 | Hendrickson | |
| 2012/0234765 A1 | 9/2012 | Sengupta et al. | |
| 2012/0305496 A1 | 12/2012 | Zadyraka et al. | |
| 2012/0325469 A1 | 12/2012 | Olsen et al. | |
| 2013/0023448 A1 | 1/2013 | Glasscott et al. | |
| 2013/0118994 A1 | 5/2013 | Altman | |
| 2013/0228446 A1 | 9/2013 | Shumway | |
| 2013/0277288 A1 | 10/2013 | Borough et al. | |
| 2017/0020326 A1 * | 1/2017 | Farley | A47J 31/4471 |

FOREIGN PATENT DOCUMENTS

| | | | |
|---|---|---|---|
| CN | 205892963 U * | 1/2017 | |
| WO | 2004094031 A1 | 11/2004 | |
| WO | WO-2008130208 A1 * | 10/2008 | B09B 1/004 |
| WO | 2008151208 A1 | 12/2008 | |

(56) References Cited

FOREIGN PATENT DOCUMENTS

WO       2009102593 A1    8/2009
WO       WO-2013018810 A1 *  2/2013   .............. C02F 9/005

OTHER PUBLICATIONS

Machine generated English language translation of CN-103830963-A (Year: 2014).*
Machine generated translation of WO2013018810A1 (Year: 2013).*
Best Management Products webpage for BMP Snout®, Feb. 3, 2011, 1 page, http://snoutsdirect.com/.
McAlister, Daniel R., Neutron Shielding Materials, Feb. 25, 2016, 14 pages, Revision 2.1, PG Research Foundation, Inc., USA.
Khanifah et al., Characteristics of Paraffin Shielding of Kartini Reactor, Yogyakarta, ASEAN Journal on Science & Technology for Development, 2018, pp. 195-198, vol. 35, No. 3.

* cited by examiner

SYSTEM AND METHOD FOR TREATING CONTAMINATED WATER

CROSS-REFERENCE TO RELATED APPLICATIONS

This application is a Continuation-in-Part of and claims priority to U.S. patent application Ser. No. 15/877,039, filed on Jan. 22, 2018, to Wayne R. Hawks entitled "System and Method for Treating Contaminated Water," currently pending, the entire disclosure of which is incorporated herein by reference, which is a Divisional of and claims priority to U.S. patent application Ser. No. 14/494,277, filed on Sep. 23, 2014, to Wayne R. Hawks entitled "System and Method for Treating Contaminated Water," now abandoned, the entire disclosure of which is incorporated herein by reference, which is a Continuation-in-Part of and claims priority to U.S. patent application Ser. No. 14/208,005, filed on Mar. 13, 2014, to Wayne R. Hawks entitled "System and Method for Treating Contaminated Water," now abandoned, the entire disclosure of which is incorporated herein by reference, which claims priority to U.S. Provisional Patent Application Ser. No. 61/779,668, filed on Mar. 13, 2013, to Wayne R. Hawks entitled "System and Method for Treating Fracturing Water, the entire disclosure of which is incorporated herein by reference. U.S. patent application Ser. No. 14/494,277 also claims priority to U.S. Provisional Patent Application Ser. No. 61/881,061, filed on Sep. 23, 2013, to Wayne R. Hawks entitled "System and Method for Treating Fracturing Water," the entire disclosure of which is incorporated herein by reference. Furthermore, this application claims priority to claims priority to U.S. Provisional Patent Application Ser. No. 62/756,481, filed on Nov. 6, 2018, to Wayne R. Hawks entitled "System and Method for Treating Contaminated Water," currently pending, the entire disclosure of which is incorporated herein by reference.

BACKGROUND OF THE INVENTION

Pollution of surface water and groundwater is a pressing issue worldwide. The water of many rivers, lakes, streams, canals, ponds, reservoirs, oceans, waterways, wells, water tables, and other sources of water has become polluted to the point where it cannot support animal life and is entirely unsafe for consumption. A substantial portion of this pollution can be attributed to various activities, including but not limited to industrial and manufacturing processes, mining practices, fossil fuel extraction, and other processes and activities. These activities additionally include hydraulic fracturing or "fracking," which is a well-known process utilized by the oil and gas industry to create and enlarge fractures in underground shale formations.

Water sources have become contaminated with a variety of chemicals and pollutants including, but not limited to, radium, chlorine gas, radioactive phosphorus, radioactive nitrogen, radioactive selenium, other radioactive materials, aluminum, boron, magnesium, toxic and heavy metals (including arsenic, beryllium, cadmium, chromium, cobalt, lead, manganese, mercury, molybdenum, selenium, strontium, thallium and vanadium, among others), carcinogens, polychlorinated biphenyl (PCB), methylcyclohexanemethanol (MCHM), industrial waste, oil, coal slurry, coal ash, fly ash, bottom ash, dioxins, sewage, bacteria, microbes, and other various pollutants. Further yet, these pollutants may become naturally transported from one geographical area to another and may also infiltrate into groundwater sources.

When elements such as aluminum, boron, and magnesium are bombarded with an alpha particle (consisting of two protons and two neutrons bound together into a particle identical to a helium-4 nucleus or, put differently, a helium ion without the two outer electrons), it creates a radioactive new transmutated element of phosphorus, nitrogen or silicon with radioactive neutrons. Currently known systems for treating water (including systems that incorporate ozone, biological active filtration (BAF), ultra filtration (UF), granulated activated carbon (GAC), UV light and advanced oxidation polishing, and reverse osmosis) are not well adapted for solving this problem. As a result, there is an accumulation of both fast and slow neutrons, which keep the above-mentioned radioactive process moving.

A need exists for a water treatment system and method adapted for removing neutrons, alpha particles and/or hydrogen ions, including radioactive hydrogen ions, from water. A need also exists for a water treatment system and method adapted for removing chloride ions and/or transmuted chlorine ions for water.

DESCRIPTION OF THE SEVERAL VIEWS OF THE DRAWINGS

In the accompanying drawings, which form a part of the specification and are to be read in conjunction therewith in which like reference numerals are used to indicate like or similar parts in the various views.

DETAILED DESCRIPTION OF THE INVENTION

Figure 1:
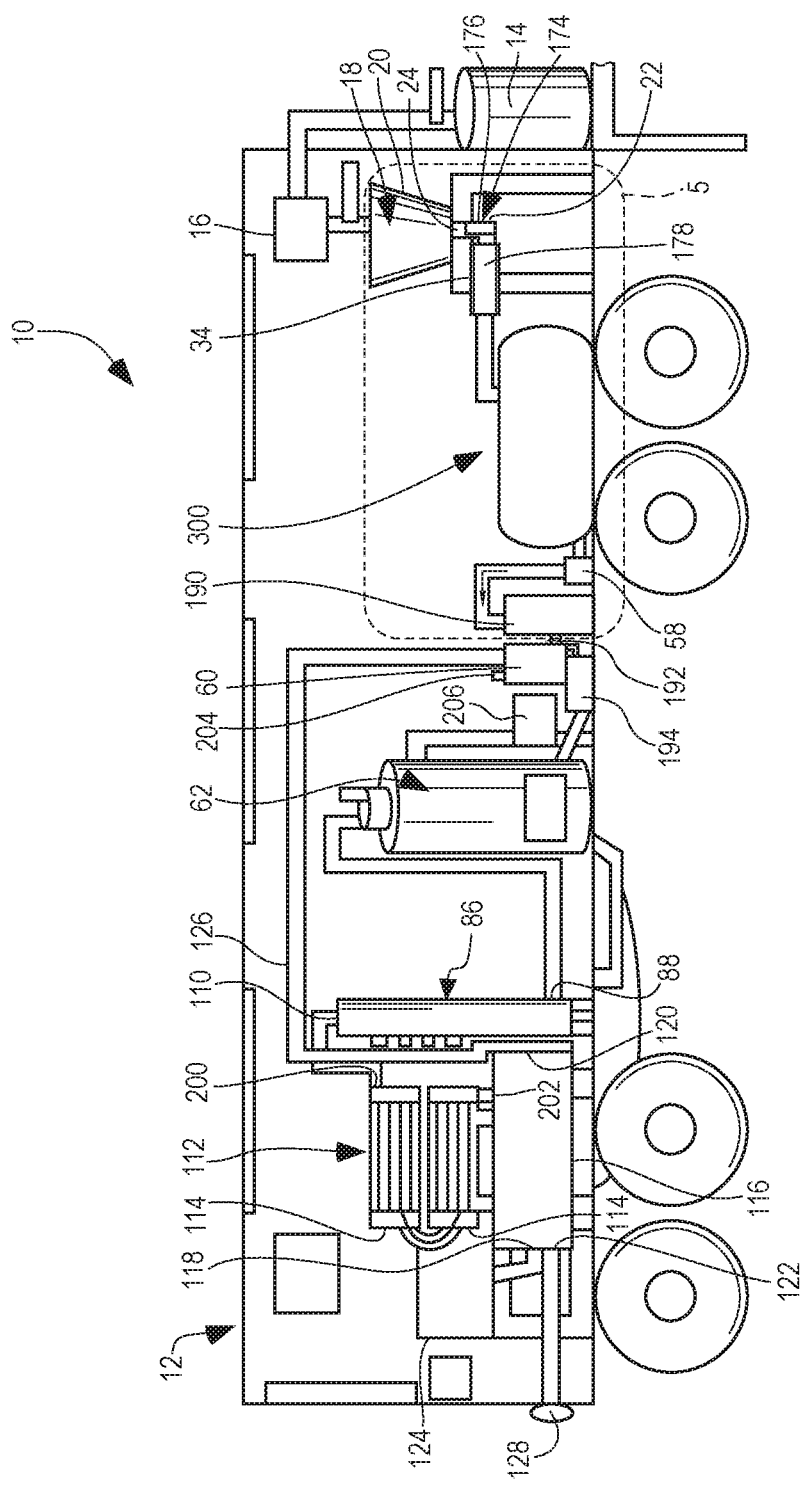
FIG. 1 is a schematic side view of a system for treating contaminated water in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures. It will be understood that some of the drawing figures depict a working, batch-scale, pilot embodiment. As set forth below, the water treatment system of the present invention can be scaled up to meet the throughput requirements associated with treating contaminated water in various large-scale scenarios, such as municipal water treatment plants, including those for towns having a population of 1,000 or fewer citizens, for example.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

The terms "contaminated water," "wastewater," and "water," when used independently of any adjectives herein, shall refer to either one or all of surface water, groundwater, runoff water (e.g., from streets, roads, buildings, parking structures, roofs, lots, greenspaces, fields, commercial and residential developments, and the like), fracking water, flowback water, produced water or other contaminated water treated by the system and method of the present invention.

Figure 2:
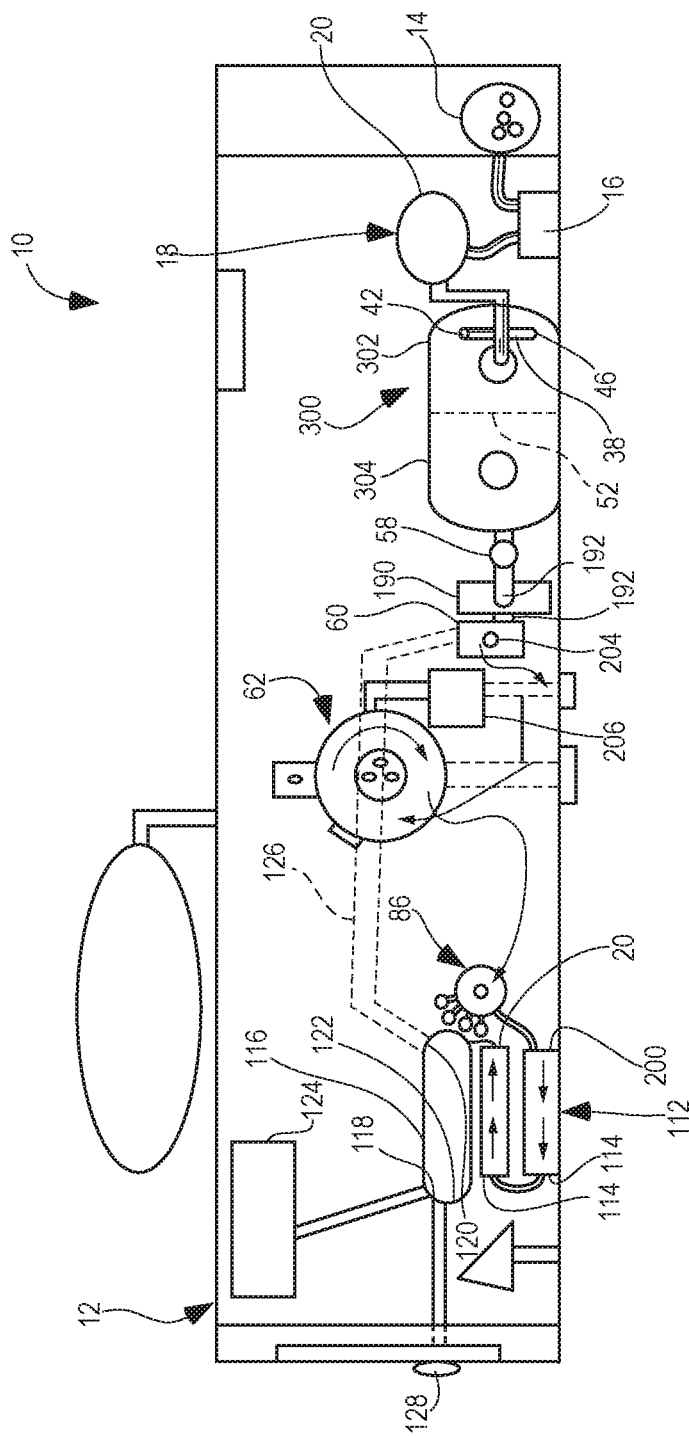
FIG. 2 is a schematic top view of a system for treating contaminated water in accordance with one embodiment of the present invention.

FIGS. 1 and 2 generally illustrate one embodiment of the system 10 of the present invention. Some or all of the components of system 10 may be stationary and permanently or semi-permanently installed at a fixed location, such as a wastewater treatment plant or other water treatment facility. Alternatively, the system 10 may be mobile and contained within one or more mobile semi-trailers 12, or may be transportable through various other modes, including but not limited to, trucks, trains, planes, boats and barges.

As illustrated, the system 10 is normally located adjacent a source of contaminated water 14, which may come directly from a well or may be contained within one or more tanks, barrels, open pools, lagoons or ponds near the well. The source of water 14 may include fracking water, flowback water, produced water, water used in coal production and dust control, water used in coal-fired power plants, water used in nuclear power plants, water from contaminated reservoirs, ponds, rivers and streams or any other source of contaminated water. A pump 16 may be provided to transport the contaminated water into the system 10. In other embodiments, the system 10 can be positioned at a location having an elevation lower than that of the contaminated water so that the contaminated water may flow into the system 10 via gravity.

Figure 3:
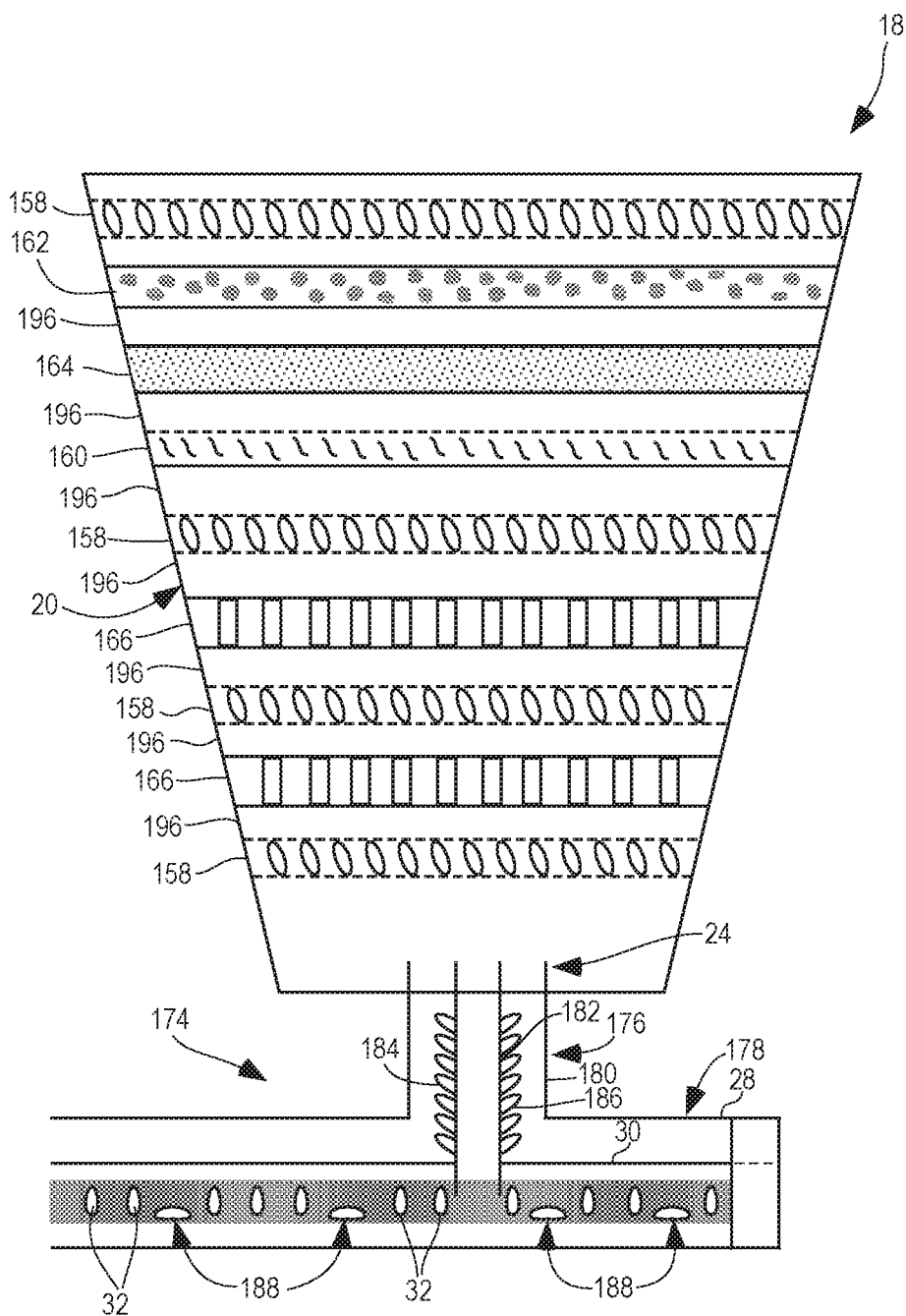
FIG. 3 is a schematic sectional side view of a clarifier and an absorptive manifold for reducing the pH of water in accordance with one embodiment of the present invention.

As illustrated in FIG. 3, the system 10 may include a filter or clarifier 18 comprising a tapered canister or filter compartment 20 having a material therein suitable for removing chloride ions and transmutated chlorine ions from water passing through the system and also absorbing neutrons from the water. The material may comprise a first filter material suitable for removing chloride ions and a second filter material suitable for absorbing neutrons. The first filter material can comprise at least one or more of ionized silicon dioxide (i.e, $SiO_2$ or sand), graphite, coconut charcoal, coconut carbon (i.e., activated carbon made from coconut shells), and coconut fibers. The second filter material can comprise paraffin 166, such as hygienic paraffin. The paraffin 166 may be placed in the clarifier 18 in place of, or in addition to, cadmium and bismuth as disclosed in earlier-filed patent applications (e.g., the above-listed U.S. patent application Ser. Nos. 14/494,277 and 14/208,005). In one embodiment, the clarifier 18 includes paraffin 166 and does not include any cadmium or bismuth. Such an embodiment may be well-suited for the treatment of water that may later by consumed by humans. As mentioned, the paraffin 166 may be adapted for absorbing slow moving neutrons. Put more specifically, the paraffin 166 may be adapted for absorbing slow moving neutrons into the nuclei of the paraffin 166. The paraffin 166 may be adapted for absorbing alpha particles, which again are helium ions without the two outer electrons. By removing neutrons, alpha particles, and transmutated hydrogen ions, there is an interruption in the chain reaction of elements that are transmutated into radioactive elements.

In one embodiment, multiple sources of water may, either simultaneously or independently, flow into the clarifier 18 through a plurality of spouts. The flow from each of these sources may be controlled at different rates in order to achieve a consistency of water required for processing by the system 10.

As shown in the embodiment illustrated in FIG. 3, the clarifier 18 may be divided into multiple sections defined by dividers 158 that may be constructed from a stainless steel mesh material, for example, or other suitable materials now known or hereafter developed. The dividers 158 may be used to hold sheets of paraffin 166, or other suitable configurations of paraffin 166, inside the clarifier 18, or may be used to provide air spaces 196 between the various sections within the clarifier 18. The dividers 158 may generally comprise a permeable design, such that water may pass through the dividers 158. The dividers 158 may also generally comprise solid structures or features, such that when water passes through the divider 158, it is dispersed or displaced.

As further shown in the embodiment illustrated in FIG. 3, an upper section of the clarifier 18 may further comprise sections or layers of ionized silicon dioxide 162, graphite 164 (which may act as a moderator), and coconut carbon 160. It will be appreciated that all of which may optionally be stored in permeable bags, such that water may pass through the bags and interact with the ionized silicon dioxide 162, graphite 164, and coconut carbon 160. It will be further appreciated that the sections or layers could alternatively be held in place using other means, such as a permeable storage vessel or other structure, capable of holding loose or free standing ionized silicon dioxide 162, graphite 164, and/or coconut carbon 160. This may be achieved using a similar design or structure as the stainless steel mesh of dividers 158, such that water may pass through the layers, while the ionized silicon dioxide 162, graphite 164, and coconut carbon 160 are held in place. It will be further appreciated that the sections or layers within the clarifier 18 could alternatively be held entirely free standing, devoid of bags or other storage structures, and create natural sections or layers based on the density of the materials. The materials may even be free floating in one embodiment. As further illustrated in FIG. 3, air spaces 196 may be optionally provided between the various sections within the clarifier 18.

As depicted, a lower section of the clarifier 18 may further comprise sections of paraffin 166 arranged in one or more sheets, similar structures, or other suitable configurations. The paraffin 166, which acts as a neutron absorber and/or alpha particle absorber, can be arranged in a plurality of layers as shown and may optionally by in the form of sheet(s) or otherwise held within the middle and lower sections. The paraffin 166 may be held in place using a similar structure as the stainless steel design of divider 158, or any other generally permeable structures such that water may pass through the structure and interact with the paraffin 166. Similar to the upper section of the clarifier 18, air spaces 196 may be found between each section or layer of paraffin 166 and divider 158 to provide spacing. Notwithstanding the foregoing, it will be appreciated that the configuration, arrangement, orientation, or order of the layers or sections within the clarifier 18 may be different than those shown in FIG. 3 or described above, depending upon the embodiment, contaminants within the water being treated, or objectives of the treatment process.

When the water exits the clarifier 18, it may enter a hydrogen absorptive manifold 174 adapted for absorbing hydrogen ions and reducing the pH of the water. The hydrogen absorptive manifold 174 can be placed downstream of and in communication with an exit end 24 of the filter compartment 20. In one embodiment, as best illustrated in FIG. 3, the manifold 174 includes a generally vertical section 176 and a generally horizontal section 178.

The vertical section 176 of the manifold 174 may include an outer pipe 180, which may be formed of copper (Cu) or other suitable material, surrounding an inner plate or tube 182, which also may be formed of copper or other suitable material. A plurality of gold fins 184 and a plurality of palladium (Pd) fins 186 can extend from the inner plate or tube 182 within an interior of the manifold 174. The outer copper pipe 180 may be effective for absorbing and concentrating hydrogen ions onto the palladium fins 186.

Figure 4A:
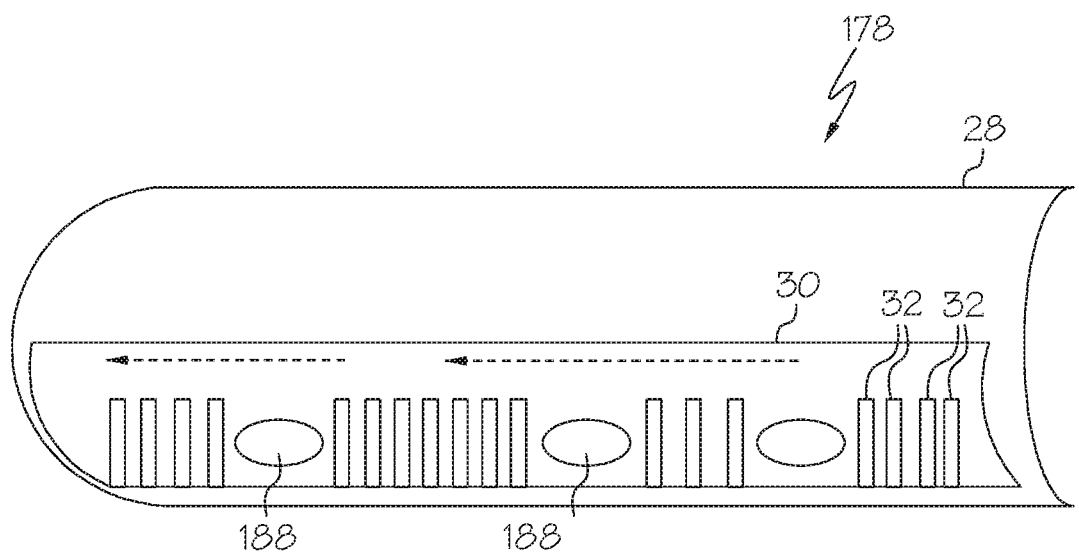
FIG. 4A is a schematic sectional side view of an absorptive manifold for reducing the pH of water in accordance with one embodiment of the present invention.

The horizontal section 178 of the manifold 174 may comprise an outer pipe 28, which may be formed of copper or other suitable material, surrounding an inner plate or tube 30, which also may be formed of copper or other suitable material. The inner plate or tube 30 may be a tube cut in half having a length generally equivalent to that of the outer pipe 28. A plurality of fins 32 can extend from the inner plate or tube 30. The fins 32 can be constructed of one or more of various materials, for example, gold, silver, palladium, nickel (Ni), zinc (Zn), tin (Sn), indium (In), and copper. In an alternative embodiment, some of the fins 32 can be constructed of bismuth. The fins 32 serve as hydrogen ion (H+) absorbers to reduce the pH in the contaminated water. In one embodiment, the pH of the water is reduced to below 7.0, preferably between about 6.4 and 6.8, in the manifold 174, which helps to prevent calcium carbonate ($CaCO_3$) and magnesium carbonate ($MgCO_3$) from precipitating out and collecting on the fins 32 thereby allowing the fins 32 to remain clean for transforming reactive pollutants into stable ions and compounds. The fins 32 can also act to change or alter phosphates, salts, nitrites, nitrates and other reactive polluting contaminants from a reactive form to a nonreactive form. Further, the fins 32 may act as a catalyst to increase soluble oxygen in the water, which causes anaerobic bacteria to be destroyed, as anaerobic bacteria cannot survive in an increased oxygen supply in water. Therefore, with the increased oxygen, the anaerobic bacteria are prevented from growing and proliferating, which could have an adverse effect on the chemical processing of a frack well. As illustrated in FIGS. 3 and 4A, one or more ferromagnets 188 may be arranged within the horizontal pipe 30 in order to attract ferromagnetic elements. By stabilizing the magnetic spin of electrons at the atomic level, the spinning electrons in the $M_s$ orbital subshell may be controlled. In achieving this stability, the $M_s$ subshell may be altered when the water is introduced into a P dope N dope voltage accelerator, as discussed in greater detail below.

Figure 4B:
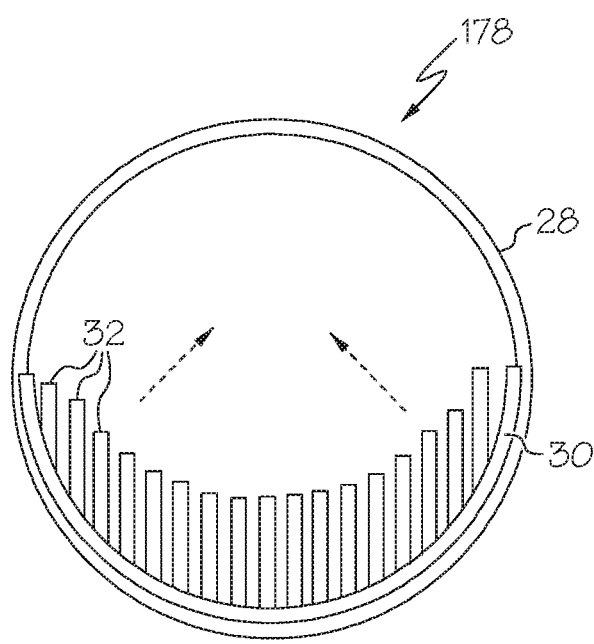
FIG. 4B is a schematic sectional end view of an absorptive manifold for reducing the pH of water in accordance with one embodiment of the present invention.

In one embodiment, as shown in FIG. 1, at least part of the manifold 174, for example the horizontal section 178, may include an electromagnet 34 in order to control electromagnetic radiation. In one embodiment, for example in a batch-scale, pilot embodiment, the outer pipe 28 is a 4-inch Type M copper pipe and the electromagnet 34 is attached to the inside of a 3-inch one half pipe at the highest pollution level water line. In this embodiment, the plate 30 can be a 3-inch diameter Type M copper pipe of generally equivalent length cut in half, as shown in FIGS. 4A and 4B.

In another embodiment, the hydrogen absorptive manifold 174 may comprise multiple vertically-stacked, perforated plates of various materials, for example, gold, silver, palladium, nickel, zinc, tin, indium, and copper. In one embodiment, the plates are constructed of thin sheets of gold, and silver. The plates may be contained in a pipe constructed of polyvinyl chloride (PVC) or other suitable material. The perforations in the various plates are not necessarily aligned with one another, in one embodiment, such that the water is required to flow across each plate as it is transferred through the hydrogen absorptive manifold 174. The plates can be adapted for replacement on a periodic basis. An aerator 22 may be placed adjacent the exit end 24 of the filter compartment 20 in order to oxygenate the water as it flows from the clarifier 18.

Figure 5:
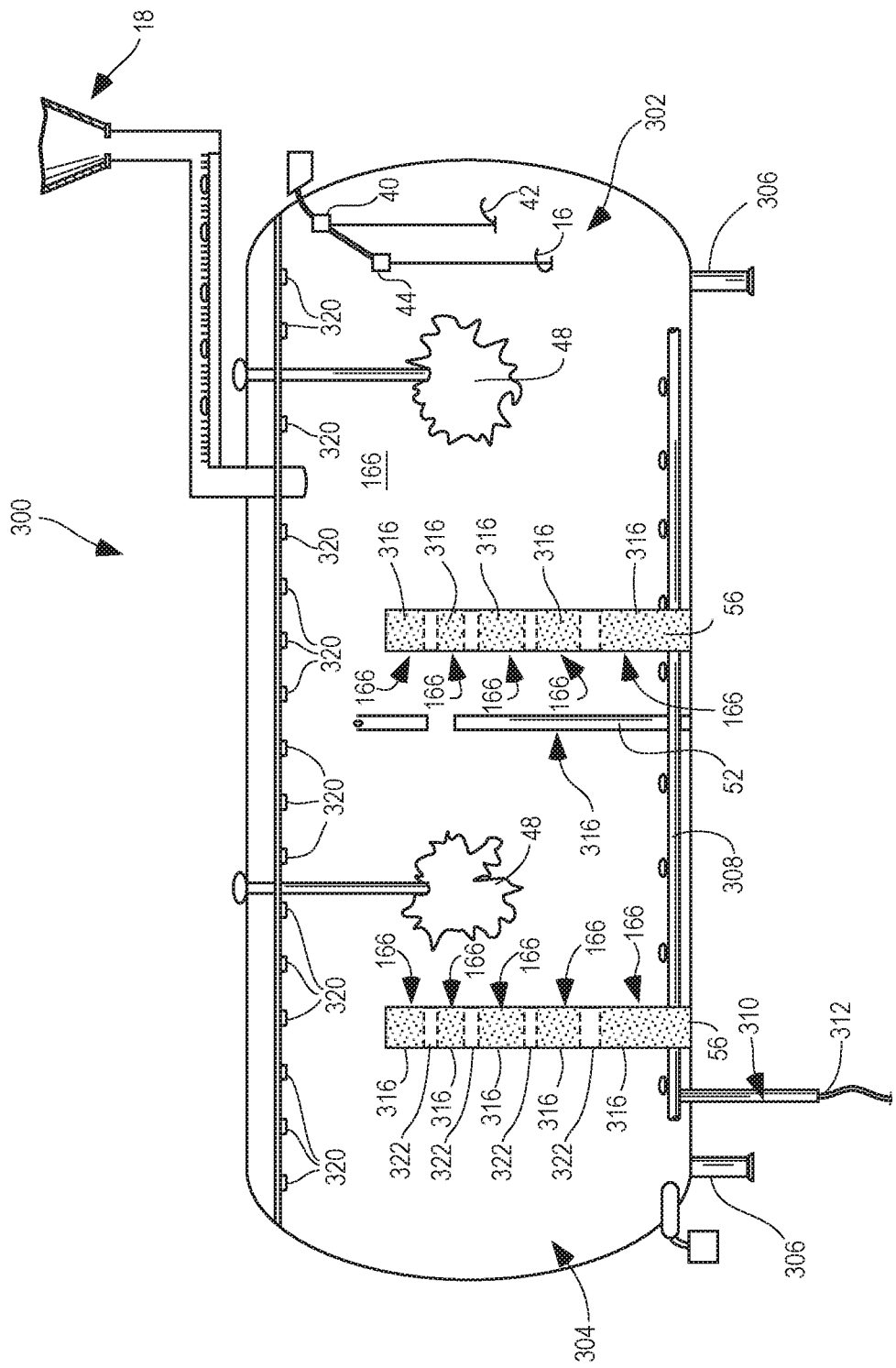
FIG. 5 is a detailed partial schematic side view of the system in the balloon 5 of FIG. 1.

As demonstrated in FIGS. 1 and 2 and further extended in FIG. 3, the system 10 can include a container 300, tank, barrel, or other suitable basin that has a P dope N dope voltage accelerator or regulator 38 associated therewith. Container 300 may be supported through use of at least one support leg 306 located on the bottom portion of tank 300. The container 300 is in fluid communication with the hydrogen absorptive manifold 174. After passing through the manifold 174, the water may then be directed to the container 300. As shown in FIGS. 2 and 5, the voltage accelerator 38 may comprise a positively-charged cathode 40 connected to a positively-charged plate 42 and a negatively-charged anode 44 connected to a negatively-charged plate 46. The plates 42 and 46 are submerged in the water located in the container 300 to induce a low voltage DC current through the water. The charge may be either 6V or 12V and have an amperage of 2, 10, 40 or 200 amperes, for example. By creating a charge on the dielectric constant, electrons are moved from one level to another in order to alter the atomic structure of each element and alter electron interaction. Optionally, light of various frequencies (and thus various colors) may be emitted into the water in container 300 through at least one light emitting device 320. As illustrated in FIG. 5, a plurality of light emitting devices 320 may be located proximate the top of the container 300 and may emit light of various frequencies. The emitted light may be red, green and/or blue and may be emitted in a flashing or strobing manner. In another embodiment, an ultraviolet light emitting device may be located proximate the bottom of the container 300.

As depicted in FIG. 5, the container 300 can also include one or more filters 48, each of which may be in the form of a hanging bag containing pollutant collection substrates such as silicon dioxide ($SiO_2$), calcium carbonate ($CaCO_3$) and paraffin to absorb chloride ions (Cr) and neutrons, including neutrons of barium (Ba). The container 300 may have two halves 302 and 304 separated by a divider 52, which may be constructed of stainless steel and have holes or other openings 316 defined therethrough through which water passes.

As shown in FIG. 5, paraffin 166 may be provided at one or more locations within the container 300. In one embodiment, the paraffin 166 is in the form of sheets held within cages 56 or other structures, which may be constructed of stainless steel and have holes or other openings 316 defined therethrough through which water passes. The steel cages may further comprise at least one chemical detection modules 322 which may be used to connect to a computer or other hardware for determining certain levels of contaminants and other information in the tank 300.

The water within the container 300 may be aerated using an aerator 308 and the container 300 may be in communication with an oxygen, air or other gas source 312 through use of tubing or piping 310.

From the container 300, the water can be directed through a magnetron 190. The magnetron 190 generates a magnetic field which interacts with polluting elements in the water as it passes through the magnetron 190. The magnetron 190 may comprise a clear plastic pipe or tube 192 passing either through or adjacent to a microwave generating device of the magnetron 190. The magnetron 190 directs water through or adjacent to the microwave generating device. By bombarding the atoms of contaminants within the water with microwaves, the magnetron 190 alters the intrinsic angular momentum and magnetic moment of the electrons in the outer or subatomic shell or subshell of those atoms. In other words, the magnetron 190 alters the fourth quantum number (i.e., spin projection quantum number, $m_s$) of the electrons in the outer or subatomic shell of those atoms. Prior to being subjected to the microwaves, those electrons have an initial spin of either +½ or −½, corresponding with "spin" (i.e., "spin up") and "opposite spin" (i.e., "spin down"), respectively due to Pauli's exclusion principle. The magnetron 190 alters those spins and, in one embodiment, reverses those spins. As such, in one embodiment, electrons having an initial up spin (i.e., $m_s$ of +½) are reversed to a down spin (i.e., $m_s$ of −½). Similarly, electrons having an initial down spin (i.e., $m_s$ of −½) are reversed to an up spin (i.e., $m_s$ of +½). With this alteration in spin, chemicals can be added to the water in the return tank 60 resulting in the precipitation of certain elements and contaminants in the water. The manipulation in spin allows for the coating of certain elements, which results in their precipitation.

In a batch-scale, pilot embodiment, the microwave generating device of the magnetron 190 may be, for example, a household microwave (such as Hamilton Beach Model P100N30ALS3B, 120V, 60 Hz, single phase, having an output of 1,000 W, 2,450 MHz). In larger-scale embodiments, larger microwave generating devices can be implemented.

From the magnetron 190, the water can be pumped into the return tank 60. The return tank 60 may include a port 204 through which chemicals or solutions may be added to the water. Since the spin of the electrons in the outer or subatomic shell of the atoms within the water have been altered or reversed by the magnetron 190, the added solution can affect the precipitation of the certain elements and contaminants in the water. In one embodiment, the solution added to the water via the port 204 may comprise an acidic solution of ethyl diamine, tetra-acidic acid, ethylenediaminetetraacetic acid (EDTA) and/or citric acid. The solution may also comprise distilled water. The volume of the various acids added to the water is dependent upon the type and amount of contaminants in the water. The addition of these acids can disrupt the polar covalent bonds of the polluted water. These acids act as chelating agents and bind metals together for further chemical reactions.

The return tank 60 can also include a port through which the return tank 60 may be pressurized by a compressed gas, such as $CO_2$, $O_2$ or the like. Oxygen may also be supplied to the water in the return tank 60. As mentioned above, an increase in soluble oxygen in the water causes anaerobic bacteria to be destroyed, as anaerobic bacteria cannot survive in such an environment.

Further, the return tank 60 may include a float that, when reaching a predetermined level, will activate a pump and/or valve 58, which may be in communication with the container 300, to transfer additional water into the return tank 60. The float system of the return tank 60 may be, for example Model 21 or Model 221 manufactured by ITT McDonnell and Miller. The magnetron 190 may be wired in series with the pump 58 such that when the pump 58 is activated, the magnetron 190 is activated. The return tank 60 can also include a pump 194 in communication therewith for pumping water into the boiler 62. When the boiler 62 reaches a predetermined water level and requires additional water, the pump 194 is activated in order to pump water from the return tank 60 to the boiler 62.

The boiler 62 may be any suitable boiler and, in the illustrated batch-scale, pilot embodiment, is a Columbia Boiler Company CT-6/10 Steam Boiler with PowerFlame JR-15A-10 Burner. Whenever the system 10 is shut down, steam from the boiler 62 can be diverted to the blow down tank 206.

Figure 6:
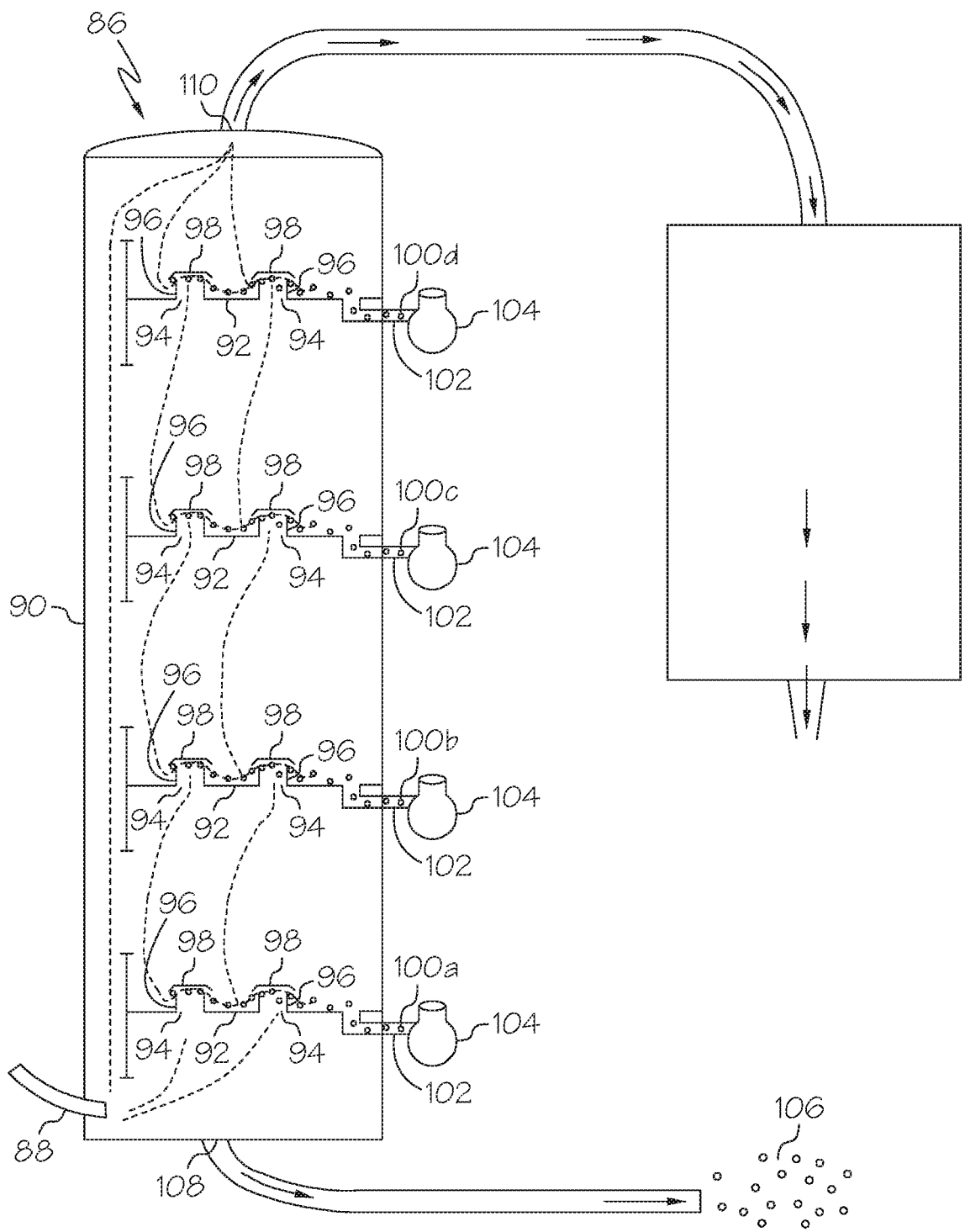
FIG. 6 is a schematic view of a fractional distillation column for a system for treating contaminated water in accordance with one embodiment of the present invention.
Figure 7A:
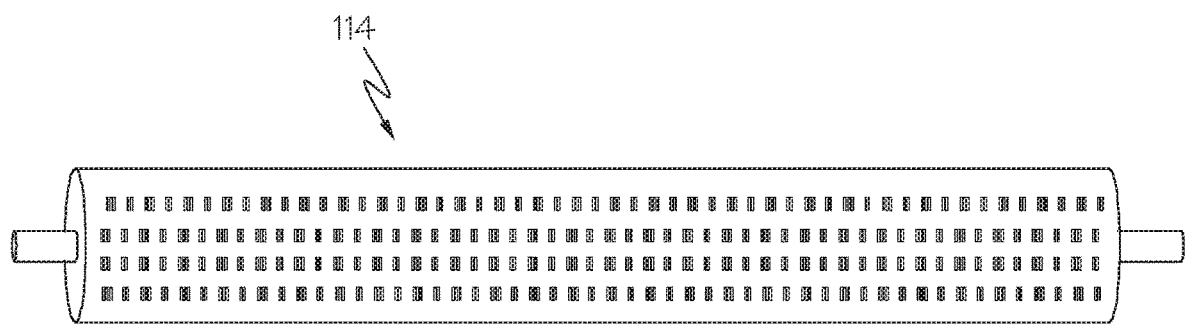
FIG. 7A is a sectional side view of a condensing unit in accordance with one embodiment of the present invention.
Figure 7B:
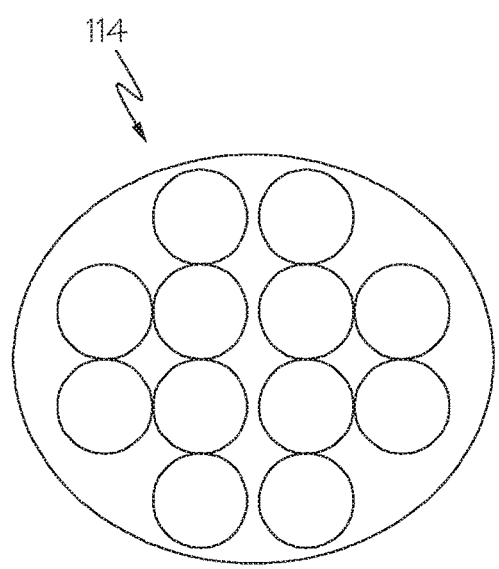
FIG. 7B is a sectional end view of a condensing unit in accordance with one embodiment of the present invention.

From the boiler 62, the steam passes into a fractional distillation separator or column 86 through an inlet aperture 88 proximate a lower end of an outer shell 90. The fractional distillation column 86 is schematically illustrated in FIG. 6. The column 86 includes a plurality of internal plates or trays 92 having apertures 94 defined therethrough. Extending upwardly from each aperture 94 may be a pipe 96. A dome-shaped cap 98 may be welded or otherwise attached to a top end of each pipe 96. The caps 98 are configured for condensing elements by atomic mass units (amu). The condensed elements 100a, 100b, 100c and 100d may include heavy metals and/or radioactive materials, such as radium-226, radium-228, uranium-238 and uranium-235, for example. The condensed elements 100a, 100b, 100c and 100d flow out of the column 86 via apertures 102 and are collected in one or more catch containers 104 where they are stored for later removal, transportation and proper disposal. Other contaminates 106 may be discharged from the fractional distillation column 86 through a lower aperture 108 or bleed off port. The column outer shell 90, plates 92, pipes 96 and caps 98 may all be constructed of stainless steel or another suitable metallic material.

Purified steam can flow from an outlet aperture 110 proximate an upper end of the fractional distillation column 86 to into a condenser or heat exchanger 112 that may include two or more condensing units 114 organized in series or parallel for increased efficiency. The heat exchanger 112 may be a double pipe heat exchanger now known or hereafter developed, a shell and tube type heat exchanger, or any other suitable type of heat exchanger, and may operate similarly to heat exchangers commonly known in the art. Like the other components of the illustrated system 10, the heat exchanger 112 may be scaled up for use in a larger-scale system. As shown in FIGS. 1 and 2, the heated steam enters the first end 200 of the heat exchanger 112, is transferred from the first condensing unit 114 to the second condensing unit 114, and then exists the second end 202 of the heat exchanger 112. Cooling liquid can be provided to the heat exchanger 112 and may flow in an arrangement that is parallel to, counter to, or cross or perpendicular to the flow of the fluid (i.e., steam and/or water) being cooled and condensed. Upon exiting the heat exchanger 112, the fluid flowing therethrough has been condensed from a steam to a liquid. Once condensed, the purified water may be between about 85° F. and 110° F., for example.

Upon existing the heat exchanger 112, the water may be collected in a tank 116, which may have three outlets 118, 120 and 122. A first outlet 118 may be connected to a test tank 124 containing one or more living organisms, such as fish, for observation of the effects of the treated water on the living organisms in order to assist in monitoring the effectiveness of the treatment process by allowing observation of the living organisms' behavior and health in the treated water. A second outlet 120 can be connected to a line 126 that delivers the water back to the return tank 60 discussed above if it is determined that additional processing of the water is necessary for increased purification levels. At this point $CO_2$ or $O_2$ under low pressure may be injected into the return tank 60 through a control orifice for chemical adjustments of the polluted water. The water may be cycled through the boiler 62 and fractional distillation column 86 as many times as necessary to treat the water. Depending upon the flow rate of water entering the return tank 60 from the magnetron 190 and the flow rate of the water entering the return tank 60 from the return line 126, the float system may prohibit flow from either the magnetron 190 or return line 126. Typically, if the combined flow rates exceed the system's capacity, flow from the magnetron 190 is prohibited or restricted if necessary. A third outlet 122 is connected to an exterior faucet 128 for connection to a tank truck or directly back to the fracking water supply system for reuse, if desired.

Another aspect of the present invention is directed to the configuration of one or more of the systems 10. Multiple water treatment systems 10, as described herein, may be placed in series or parallel. The system 10 is readily scalable by adding similarly equipped semi-trailers 12 to the system 10. When multiple semi-trailers 12 are utilized, some of the system's 10 components may be located on one semi-trailer 12, while other of the system's 10 components may be located on other semi-trailers 12. The water treatment system 10 of the present invention may be centrally located for use by multiple well sites 130. Furthermore, it will be appreciated that the system 10 of the present invention can be suitable for treating any water, including water in municipal water treatment plants of various sizes and capacities, particularly when system comprises paraffin 166 in place of cadmium and bismuth. The system 10 may also be suitable for treating fracking water, flowback water and produced water from hydraulic fracturing operations.

Figure 8:
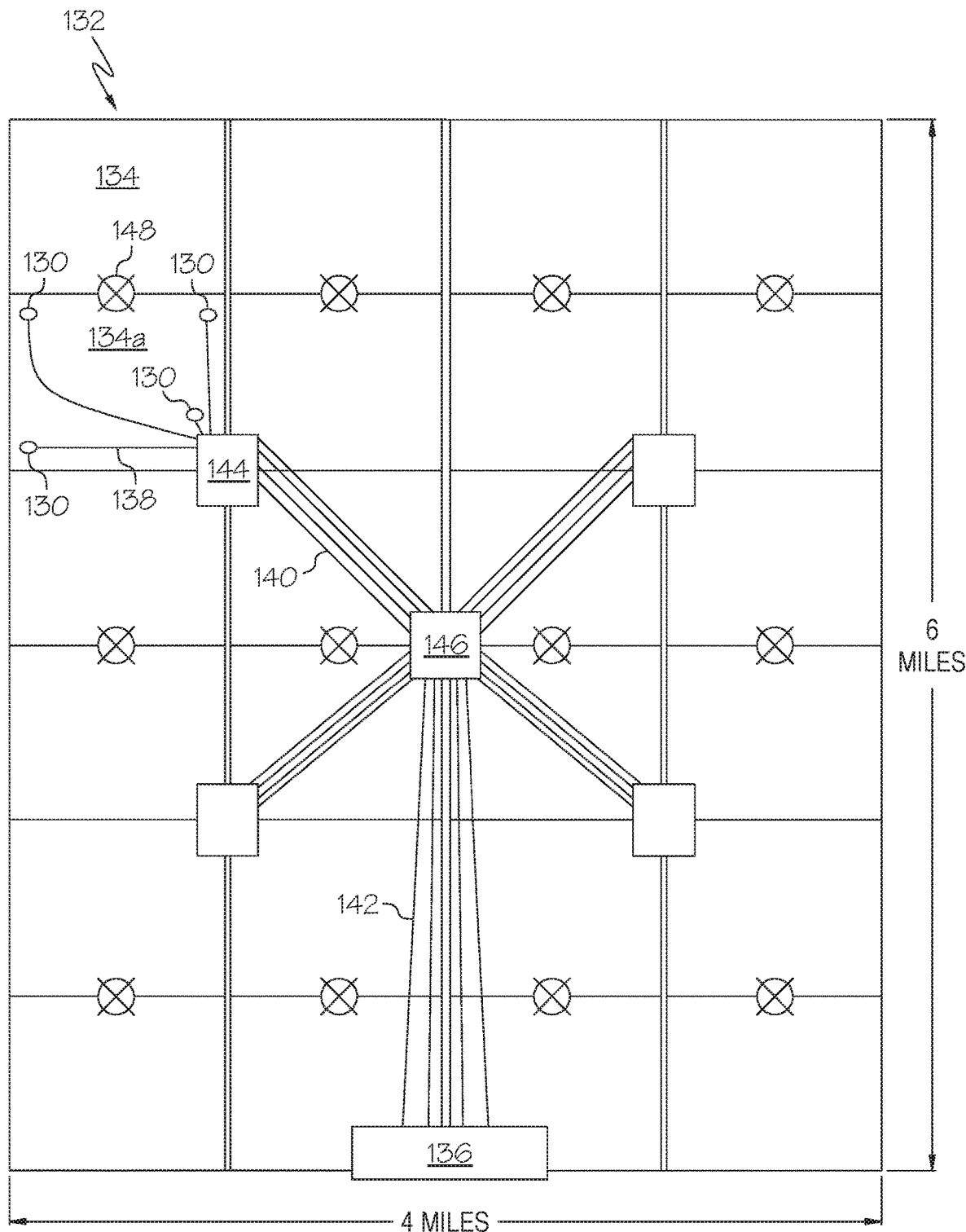
FIG. 8 is an overhead schematic layout of a multiple drilling site operation including a central water treatment plant in accordance with one embodiment of the present invention.

As illustrated in FIG. 8, one or more of the water treatment systems 10 of the present invention may be centrally located for use by multiple well sites 130 or locations. FIGS. 8 and 8 each depict an area of land 132 that may consist of a plurality of square miles or sections 134. In one embodiment, the area of land 132 includes twenty-four (24) square mile sections 134. Each section 134 can include one or more well sites 130 having a well drilled thereon, as represented by sections 134a, 134b and 134c. In one embodiment, the area of land 132 includes sixty-four (64) well sites 130; however, it will be understood that any number of well sites 130 may be located within the area of land 132.

As demonstrated in FIG. 8, a central water treatment facility or plant 136 may be adapted and scaled for treating the contaminated water 14 (e.g., fracking water, flowback water, produced water, etc.) associated with each of the well sites 130. The central water treatment plant 136 comprises one or more of the systems 10 of the present invention and may be set up on a mobile, temporary, semi-permanent or permanent basis, as desired. The water from each well site 130 may be transported to the central plant 136 by any suitable means, including but not limited to, piping, trench, channel, tanker truck or railcar. As illustrated by the well sites 130 placed on section 134a, the water from each of the well sites 130 may be transported to the central plant 136 via pipes 138, 140 and 142. Optionally, one or more satellite centers 144 and 146 are provided where the water may be collected from multiple well sites 130 for further transportation to a central plant 136. In one embodiment, the satellite centers 144 and 146 may suitably equipped for undertaking a portion of the water treatment process prior to the water being further transported to the central plant 136. The pipes 138 transporting the water from the well sites 130 to the satellite centers 144 and 146 may be of one diameter (e.g., 4 inch), while the pipes 140 and 142 transporting the water from satellite centers 144 and 146 to the central plant 136 may of another, larger diameter (e.g., 8 inch). As depicted in FIG. 8, the need for disposal wells 148 can be eliminated, as represented by each disposal well 148 having an "X" placed thereon. In the example shown, twelve (12) disposal wells 148 are eliminated.

Upon the water being treated at the central plant 136, the water may transported back to other well sites 130, for example via the pipes 142, 140 and 138, for use in the fracking process at those other well sites 130. In other words, the treated water may leave the central plant 136 via a pipe 142, arrive at a first satellite center 146, be directed from the first satellite center 146 to a second satellite center 144 via a pipe 140, and then be directed from the second satellite center 144 to a well site 130 that is ready for fracking via a pipe 138. As such, the water may be used at one well site 130, be treated at the central plant 136, and then used again at another well site 130 upon treatment. Alternatively, the treated water may be discharged from the central plant 136 to a stream or other body of water or otherwise transported from the central plant 136 upon treatment.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting. It will also be appreciated the components of the system need not be in the order shown in the figures and described above. Rather, depending upon the water to be treated, the components may be aligned or arranged in a different order. In some embodiments, some of the components may be bypassed if certain types of treatment are not necessary. In other embodiments, the water may be cycled through one or more of the components multiple times in order to achieve necessary purification levels.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A water treatment system comprising:
   a filter vessel comprising:
   a filter compartment containing a filter material, wherein the filter material comprises:
      a first layer comprising a first filter material for removing at least one of chloride ions and transmuted chlorine ion from water; and
      a second layer comprising a second filter material for absorbing neutrons from water, wherein the second filter material comprises paraffin;
      wherein the second layer is positioned below the first layer.

2. The water treatment system of claim 1, wherein the first filter material comprises coconut carbon.

3. The water treatment system of claim 1 further comprising an absorptive manifold in fluid communication with the filter compartment for absorbing hydrogen ions to reduce a pH of the water.

4. The water treatment system of claim 1 further comprising a container downstream of the filter compartment, the container having paraffin therein.

5. A water treatment system comprising:
   a filter vessel comprising a filter compartment containing a filter material, wherein the filter material comprises:
   a first layer comprising a first filter material for removing at least one chloride ions and transmuted chlorine ions from water; and
   a second layer comprising a second filter material for absorbing at least one of neutrons and alpha particles from water, wherein the second filter material comprises paraffin;
   wherein the second layer is positioned below the first layer.

6. A water treatment system comprising:
   a filter vessel comprising a filter compartment containing a first filter layer containing coconut carbon for removing at least one of chloride ions and transmuted chlorine ions from the water, and further comprising a second filter containing paraffin for absorbing at least one of the neutrons and alpha particles from water, wherein the second filter layer is positioned below the first filter layer.

7. The water treatment system of claim 6 further comprising an absorptive manifold in fluid communication with the filter compartment for absorbing hydrogen ions to reduce a pH of the water.

* * * * *